(12) United States Patent
Kopylovitz

(10) Patent No.: US 8,688,908 B1
(45) Date of Patent: Apr. 1, 2014

(54) MANAGING UTILIZATION OF PHYSICAL STORAGE THAT STORES DATA PORTIONS WITH MIXED ZERO AND NON-ZERO DATA

(75) Inventor: Haim Kopylovitz, Herzliya (IL)

(73) Assignee: Infinidat Ltd, Herzliya (IL)

( * ) Notice: Subject to any disclaimer, the term of this patent is extended or adjusted under 35 U.S.C. 154(b) by 448 days.

(21) Appl. No.: 12/901,723

(22) Filed: Oct. 11, 2010

(51) Int. Cl.
*G06F 12/00* (2006.01)

(52) U.S. Cl.
USPC ........... 711/114; 711/162; 711/173; 711/165; 711/E12.002

(58) Field of Classification Search
USPC ................... 711/114, 162, 173, 165, E12.002
See application file for complete search history.

(56) References Cited

U.S. PATENT DOCUMENTS

| 2009/0089534 | A1 | 4/2009 | Zohar et al. |
| 2009/0240880 | A1 | 9/2009 | Kawaguchi |
| 2010/0205390 | A1 | 8/2010 | Arakawa |
| 2011/0271071 | A1* | 11/2011 | Nakatogawa ................. 711/165 |

FOREIGN PATENT DOCUMENTS

WO 2009044397 A2 4/2009

* cited by examiner

*Primary Examiner* — Mardochee Chery
(74) *Attorney, Agent, or Firm* — Reches Patents

(57) ABSTRACT

A method and system is disclosed for storage optimization of thin provisioning. Non-zero data units within data portions are re-allocated to specifically designated one or more areas in the physical storage space and the physical address of the non-zero data unit within the designated area is associated with the logical address of the non-zero data unit. In case the data portion is allocated to the physical storage, the physical storage space initially allocated to the data portion is returned to the pool of available physical storage space, thereby freeing the storage space for storing other data.

18 Claims, 5 Drawing Sheets

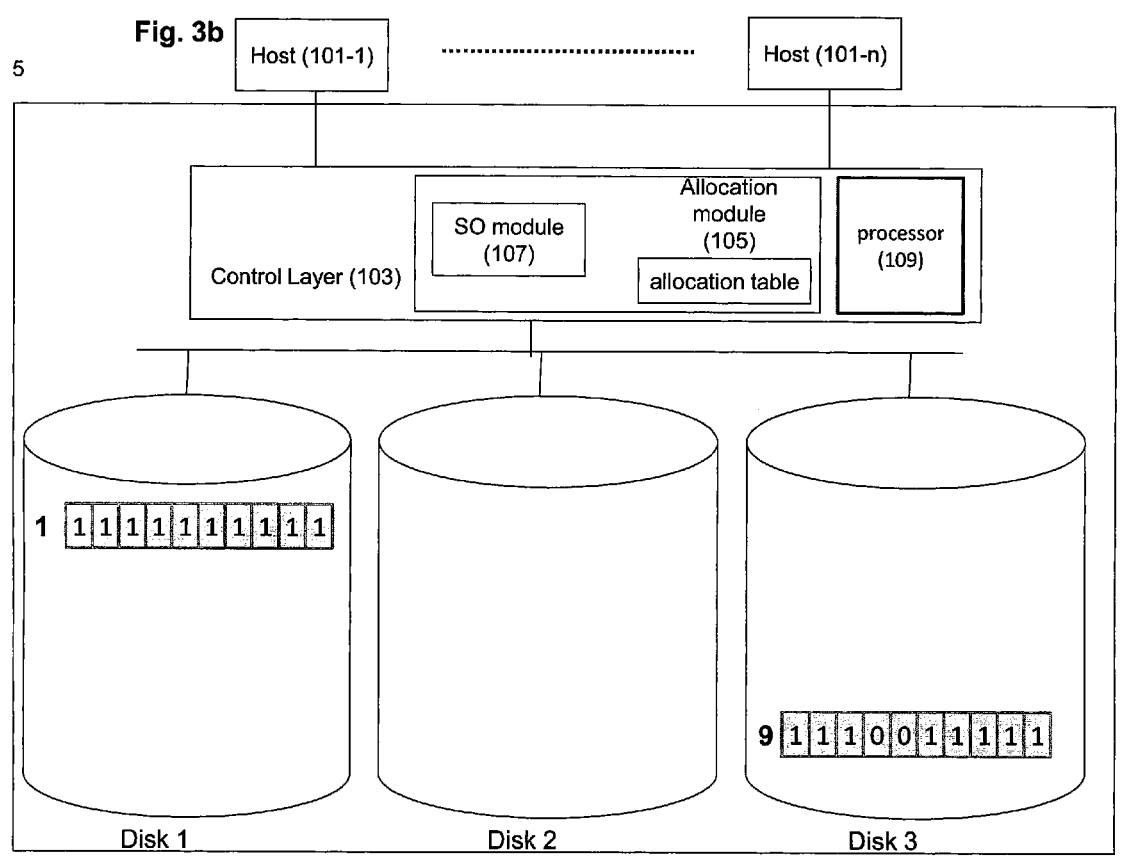

MANAGING UTILIZATION OF PHYSICAL STORAGE THAT STORES DATA PORTIONS WITH MIXED ZERO AND NON-ZERO DATA

FIELD OF THE INVENTION

This invention relates in general to the field of computer storage systems and more specifically to the optimization of computer storage systems utilizing thin provision.

BACKGROUND OF THE INVENTION

Growing complexity of storage infrastructure requires solutions for efficient use and management of resources. The use of a virtualized storage system enables to present to the user a logical space for data storage while the storage system itself handles the process of mapping it to the actual physical location. Today many virtualized storage systems implement thin provisioning. Thin provisioning is a method of optimizing the efficiency of utilization of available storage space in a storage system (including storage area network systems (SAN)). Thin provisioning operates by dynamically allocating disk space among users according to the actual space required by each user at any given time. Thin provisioning is different from the traditional model of "thick" or "fat" provisioning, which operates by allocating predefined storage spaces to users. In fat provisioning, storage spaces are often of a large size which is not adapted to the current needs of the user and thus, substantial parts of the allocated storage space often remain unused while the user is still required to pay for the unused space and its maintenance.

Zero page reclamation (ZPR) is a capability which is used with thin provisioning and enables to examine the content of data allocated to the physical storage and identify data portions of a predefined size, which contain only zeros. Such data portions can be unmapped from the physical storage while only their virtual representation is recorded. The physical storage can be thus freed and returned to the pool of available free storage space. In response to a request (e.g. to a read request) for a data portion containing only zeros, the data can be easily reconstructed. Accordingly, ZPR enables to further expand thin-provisioning and utilize disk storage space more efficiently.

Prior art references considered to be relevant as background to the invention are listed below. Acknowledgement of the references herein is not to be inferred as meaning that these are in any way relevant to the patentability of the invention disclosed herein.

US20090089534 discloses a method for migrating data to a mass storage system, including receiving an incoming data partition for storage in the mass storage system and allocating logical storage for the incoming data partition in the mass storage system. The method further includes making a determination that the incoming data partition includes only zero data, and, in response to the determination, inhibiting physical storage of the incoming data partition in the mass storage system while maintaining the allocated logical storage for the incoming data partition.

There is still a need in the art to further improve the efficiency of the utilization of physical storage.

SUMMARY OF THE INVENTION

According to a first aspect of the invention there is provided a storage system, the system comprising: a plurality of physical storage devices controlled by a plurality of storage control devices constituting a storage control layer, the storage control layer operatively coupled to the plurality of physical storage devices, wherein the storage control layer being operable to analyze a data portion and to identify zero and non-zero data units within the data portion, and in case of identifying at least one non-zero data unit which meets one or more predetermined criteria, the control layer is further operable to perform at least the following:

re-allocate the non-zero data unit to a designated area in the physical storage space; whilst associating the physical address of the non-zero data unit within the designated area with the logical address of non-zero data unit and in case the data portion is allocated to the physical storage, return the physical storage space initially allocated to the data portion to the pool of available physical storage space.

According to certain embodiments of the invention the control layer is operatively connected to one or more hosts and, in response to a read request issued by a host, is operative to perform at least the following:

identify at least one data portion corresponding to the read request comprising at least one non-zero data unit characterized by a logical address associated with a designated area; retrieve the at least one non-zero data unit from the designated area based on its physical address; locate the at least one non-zero data unit within respective data portion based on logical addresses of the data portion and of the non-zero data unit.

According to a second aspect of the invention there is provide an SO (storage optimization) module operatively connectable to a storage control layer in a storage system, the storage system comprising a plurality of physical storage devices controlled by a plurality of storage control devices constituting the storage control layer, the layer operatively coupled to the plurality of physical storage devices; the SO module being operable to analyze a data portion and to identify zero and non-zero data units within the data portion, and in case of identifying at least one non-zero data unit which meets one or more predetermined criteria, the control layer is further operable to perform at least the following:

re-allocate the non-zero data unit to a designated area in the physical storage space; whilst associating the physical address of the non-zero data unit within the designated area with the logical address of the non-zero data unit and in case the data portion is allocated to the physical storage, return the physical storage space initially allocated to the data portion to the pool of available physical storage space.

According to a third aspect of the invention there is provided a method of allocating data to a physical data storage associated with a storage system, the method comprising:

analyzing a data portion to identify zero and non-zero data units within the data portion; in case the source data portion is determined to comprise at least one non-zero data unit which meets one or more predetermined criteria, instructing a processor associated with the storage system to perform at least the following: identifying a logical address of the at least one non-zero data unit; re-allocating the non-zero data unit to a designated area in the physical storage; storing the physical address of the non-zero data unit within the designated area in association with the logical address of the at least one non-zero data unit; and in case the data portion is allocated to the physical storage, un-map the source data portion from the physical storage, and return a physical storage space initially allocated to the data portion to the pool of available physical storage space.

According to a fourth aspect of the invention there is provided a storage system comprising: a plurality of physical storage devices controlled by a plurality of storage control devices constituting a storage control layer, the storage control layer operatively coupled to the plurality of physical storage devices, and to one or more hosts and operative in response to a read request, issued by a host, in respect of requested data, to perform at least the following: identify at least one data portion corresponding to the read request and comprising at least one non-zero data unit characterized by a logical address associated with a designated area, retrieve the at least one non-zero data unit from the designated area based on its physical address; locate the at least one non-zero data unit within respective data portion based on logical addresses of the data portion and of the non-zero data unit; wherein the data portion comprises a plurality of zero data units and the control layer is further operable to regenerate the plurality of data units and reconstruct the data portion.

According to a fifth aspect of the invention there is provided a program storage device readable by machine, tangibly embodying a program of instructions executable by the machine to perform method steps of allocating data to a physical data storage associated with a storage system, the method comprising: analyzing a data portion to identify zero and non-zero data units within the data portion; in case the source data portion is determined to comprise at least one non-zero data unit which meets one or more predetermined criteria, instructing a processor associated with the storage system to perform at least the following: identifying a logical address of the at least one non-zero data unit; re-allocating the non-zero data unit to a designated area in the physical storage; storing the physical address of the non-zero data unit within the designated area in association with the logical address of the at least one non-zero data unit; and in case the data portion is allocated to the physical storage, un-map the source data portion from the physical storage, and return a physical storage space initially allocated to the data portion to the pool of available physical storage space.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 3a and 3b are illustrations demonstrating data allocation in a storage optimization process, according to an embodiment of the invention.

DETAILED DESCRIPTION

Figure 1:
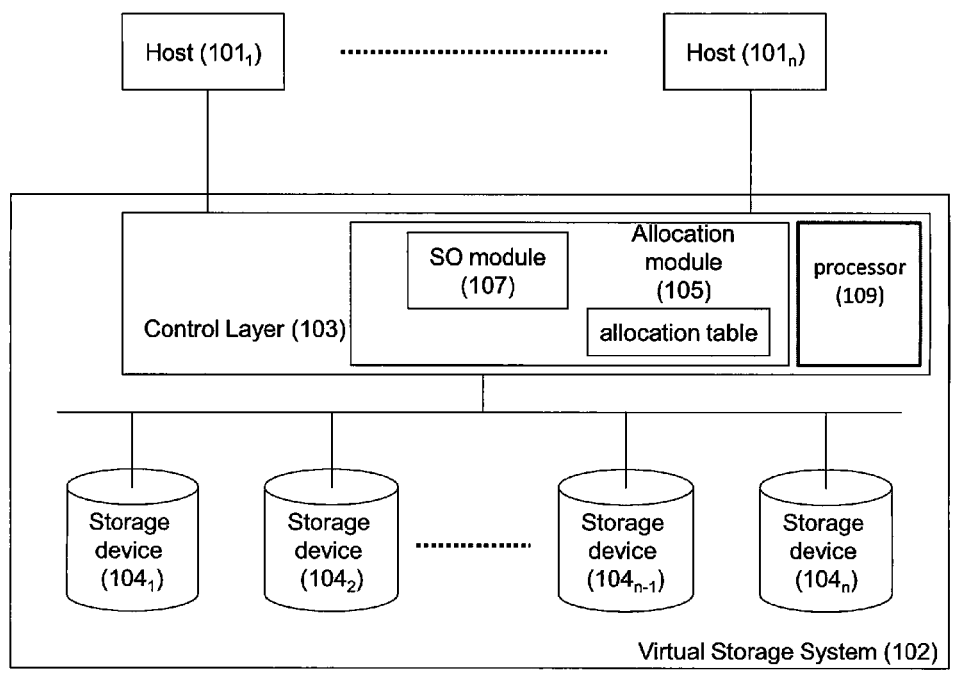
FIG. 1 illustrates a schematic functional block diagram of a computer system with virtualized storage system, according to an embodiment of the invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "controlling", "configuring", "receiving", "enabling", "performing", "executing", "monitoring", "analyzing", "determining", "defining" or the like, include action and/or processes of a computer that manipulate and/or transform data into other data, the data represented as physical quantities, e.g. such as electronic quantities, and/or the data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the present invention. Reference in the specification to "one implementation", "some implementations", "certain implementations", "other implementations", "another implementations", "one embodiment", "an embodiment", "some embodiments", "another embodiment", "other embodiments", "certain embodiments", "one instance", "some instances", "one case", "some cases", "other cases" or variants thereof means that a particular feature, structure or characteristic described in connection with the embodiment(s) is included in at least one embodiment of the invention. Thus the appearance of the phrase "one embodiment", "an embodiment", "some embodiments", "another embodiment", "certain embodiments", "other embodiments", "one instance", "some instances", "one case", "some cases", "other cases" or variants thereof does not necessarily refer to the same embodiment(s).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Figure 2:
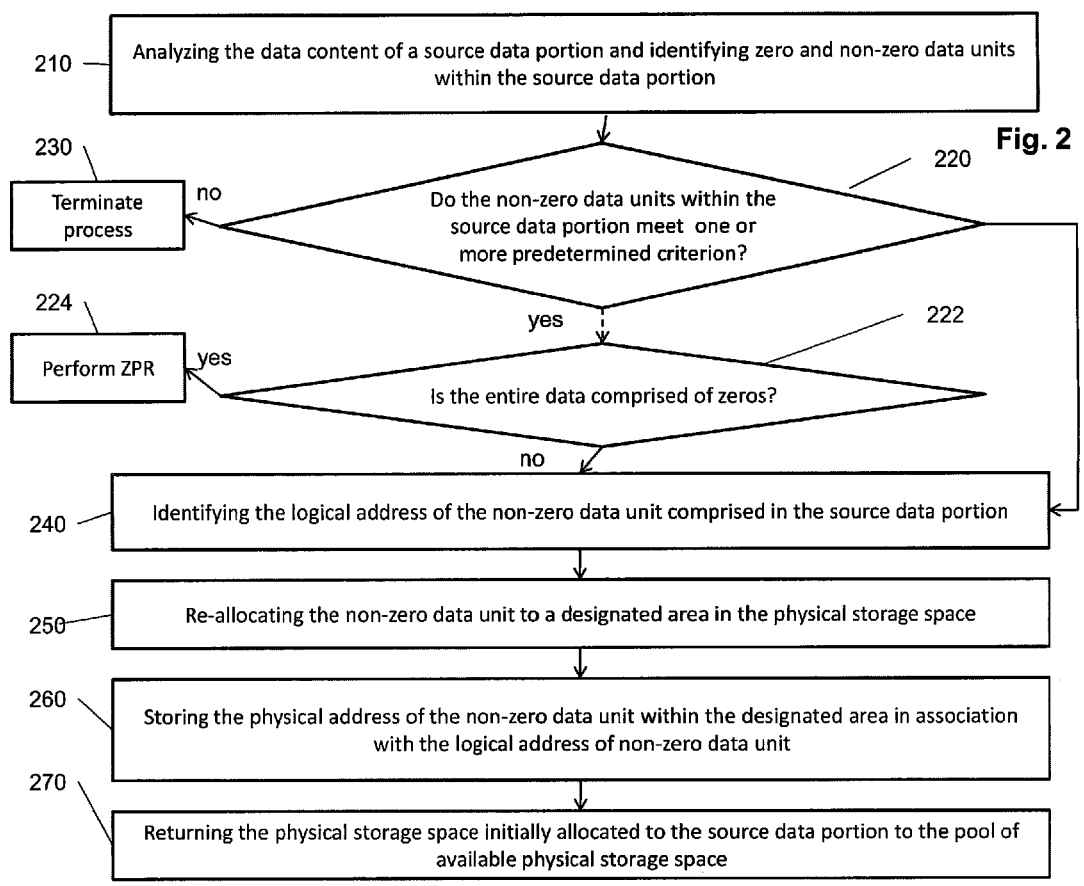
FIG. 2 is a flowchart illustrating operations which are performed in a storage optimization process, according to an embodiment of the invention.

In embodiments of the invention, fewer, more and/or different stages than those shown in FIGS. 2 and 5 may be executed. In embodiments of the invention one or more stages illustrated in FIGS. 2 and 5 may be executed in a different order and/or one or more groups of stages may be executed simultaneously.

Certain embodiments of the present invention are applicable to the architecture of a computer system described with reference to FIG. 1. However, the invention is not bound by the specific architecture, equivalent and/or modified functionality may be consolidated or divided in another manner and may be implemented in any appropriate combination of software, firmware and hardware. Those versed in the art will readily appreciate that the invention is, likewise, applicable to any computer system and any storage architecture implementing a virtualized storage system. In different embodiments of the invention the functional blocks and/or parts thereof may be placed in a single or in multiple geographical locations (including duplication for high-availability); operative connections between the blocks and/or within the blocks may be implemented directly (e.g. via a bus) or indirectly, including remote connection. The remote connection may be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

Bearing this in mind, attention is drawn to FIG. 1 illustrating a schematic functional block diagram of a computer system with a virtualized storage system, according to an embodiment of the invention. The computer system comprises a plurality of host computers (workstations, application servers, etc.) illustrated as $101_{1-n}$ sharing common storage means provided by a virtualized storage system 102. The storage system comprises a storage control layer 103 comprising one or more appropriate storage control devices operatively coupled to the plurality of host computers and a plurality of data storage devices $104_{1-n}$ constituting a physical storage space optionally distributed over one or more storage nodes, wherein the storage control layer 103 is operable to control interface operations (including I/O operations) between hosts $101_{1-n}$ and data storage devices $104_{1-n}$. The storage control layer 103 is further operable to handle a virtual representation of physical storage space and to facilitate necessary mapping between the physical storage space and its virtual representation. Control layer 103 is configured to create and manage at least one virtualization layer interfacing between elements of the computer system (host computers, etc.) external to the storage system and the physical storage space.

The virtualization functions may be provided in hardware, software, firmware or any suitable combination thereof. Optionally, the functions of control layer 103 may be fully or partly integrated with one or more host computers and/or storage devices and/or with one or more communication devices enabling communication between the hosts and the storage devices. Optionally, a format of logical representation provided by control layer 103 may differ, depending on interfacing applications.

The physical storage space may comprise any appropriate permanent storage medium and include, by way of non-limiting example, one or more disk drives and/or one or more disk units (DUs). The physical storage space comprises a plurality of data blocks, each data block may be characterized by a pair ($DD_{id}$, DBA) where $DD_{id}$ is a serial number associated with the disk drive accommodating the data block, and DBA is a logical block number within the respective disk. By way of non-limiting example, $DD_{id}$ may represent a serial number internally assigned to the disk drive by the system or, alternatively, a WWN or universal serial number assigned to the disk drive by a vendor. The storage control layer 103 and storage devices $104_{1-n}$ may communicate with host computers $101_{1-n}$ and within the storage system in accordance with any appropriate storage protocol.

Stored data may be logically represented to a client (host) in terms of logical objects. Depending on storage protocol, the logical objects may be logical volumes, data files, multimedia files, snapshots and other copies, etc. For purpose of illustration only, the following description is provided with respect to logical objects represented by logical volumes. Those skilled in the art will readily appreciate that the teachings of the present invention are applicable in a similar manner to other logical objects.

A logical volume (LU) is a virtual entity logically presented to a client as a single virtual storage device. The logical volume represents a plurality of data blocks characterized by successive Logical Block Addresses (LBA) ranging from 0 to a number LUK. Different LUs may comprise different numbers of data blocks, while the data blocks are typically of equal size (e.g. 512 bytes). Blocks with successive LBAs may be grouped into portions that act as basic units for data handling and organization within the system. Thus, for instance, whenever space has to be allocated on a disk or on a memory component in order to store data, this allocation may be done in terms of "data portions" otherwise also known as "allocation units". Data portions are typically (but not necessarily) of equal size throughout the system which (by way of non-limiting example, the size of data portion may be 64 Kbytes). Successive data portions constituting a logical volume are typically stored in different disk drives (e.g. for purposes of both performance and data protection), and to the extent that it is possible, across different DUs. For purpose of illustration only, the operation of the storage system 102 is described herein in terms of entire data portions. Those skilled in the art will readily appreciate that the teachings of the present invention are applicable in a similar manner to partial data portions.

Typically, definition of LUs in the storage system involves in-advance configuring an allocation scheme and/or allocation function used to determine the location of the various data portions (and their associated parity portions) across the physical storage medium. The allocation scheme can be handled for example, by an allocation module 105 being a part of the storage control layer 103. The location of various data portions allocated across the physical storage can be recorded and monitored with the help of one or more allocation tables linking between logical data addresses and their corresponding allocated location in the physical storage.

The allocation module 105 may be implemented as a centralized module operatively connected to the plurality of storage control devices or may be, at least partly, distributed over a part or all storage control devices. Logical contiguity of successive portions and physical contiguity of the storage location allocated to the portions in the system are not necessarily correlated. FIG. 1 also shows processor 109 being configured to manage and control different modules and operations associated with storage system 102 in general and more specifically with control layer 103. It should be noted that although the term processor is used herein in its singular form, it should be interpreted to include any one or more processors operationally coupled to storage system 102.

As explained in more detail below, control layer 103 can be further operable to perform storage optimization on data portions which are stored on storage devices $104_{1-n}$, which is not limited to data portion comprising only zeros. To this end control layer 103 can comprise, (or otherwise be associated with), a storage optimization (SO) module 107. SO module 107 can be, for example, part of allocation module 105 or otherwise associated therewith.

Control layer 103 can be operable to receive one or more data portions and determine the data content of these portions i.e. the relative portion of zero content in respect of the entire data in a given data portion. The data portions can be for example data portions which are stored in storage devices $104_{1-n}$. Such data portions can be retrieved from storage devices $104_{1-n}$ by control layer 103, for example, during an inspection process directed for improving storage efficiency and quality. An example of such a process is a scrubbing operation. In a scrubbing operation data portions stored in storage devices are inspected in order to identify different errors in the data (e.g. incorrect data, incomplete data, duplicated data, readable or unreadable data etc.). Such errors can then be rectified, thereby maintaining data integrity and correctness. Thus, the operations performed by control layer 103 and storage optimization module 107 as described herein can be performed on data portions which are retrieved from the data storage devices $104_{1-n}$ specifically for that purpose or which are retrieved as part of a scrubbing process. The data portions can be also received from one or more of hosts $101_{1-n}$ (e.g. in a write request to the storage system) and processed before they are stored with storage devices $104_{1-n}$.

In some implementations of the invention, in case it is determined that the data content in a received data portion comprises only zeros, control layer 103 (e.g. via allocation module 105) can be operable to perform zero page reclaiming (ZPR). As explained above ZPR enables to un-map from the physical storage, data portions comprising only zeros and thereby free the disk space. Control layer 103 can be further operable to update a corresponding allocation table and remove a link connecting between the logical address of the data portion (e.g. LBA range) and its physical location on the storage device. In some implementations control layer 103 can be configured to add to the allocation table a specific indication in association with the address of the relevant data portion indicating that the relevant data portion (e.g. defined by its LBA range) contains only zeros, while in other implementations the absence of a physical address in the allocation table is a sufficient indication for that purpose. In response to a read request of an only zero data portion, which has been un-mapped from the physical storage in a ZPR process, the data can be reconstructed based on the information in the allocation table.

In case it is determined that the data content in the received data portion comprises of a combination of zero and non-zero data units, control layer 103 (e.g. via SO module 107) is operable to determine whether the non-zero data units meet one or more predetermined criteria. In case it does, control layer 103 (e.g. via SO module 107) is operable to perform a storage optimization during which the non-zero data units are re-allocated to one or more specifically designated areas in the physical storage space while associating the physical address of the non-zero data unit within the designated area with the logical address of non-zero data unit and in case the data portion is allocated to the physical storage, return the physical storage space initially allocated to the data portion to the pool of available physical storage space. A more detailed explanation of this process is described below with reference to FIG. 2 and FIG. 3.

Zero and non-zero data content can be represented as data units of predefined size. In the present description the term "data unit" is used to refer in general to a data unit of any size. For example, in case a data portion is defined with a size of 64 kbyte it can be divided into data units of 512 bytes blocks, (consisting of about 128 blocks). However, other data units of other size such as bytes or bits can also be used as well. A data unit which is determined to contain non-zero content may contain a combination of zero and non-zero data or only non-zero data and is referred herein as a "non-zero data unit". A data unit which is determined to contain only zero content may not contain anything but zeros and is referred to herein as a "zero data unit".

The predetermined criteria can be defined for example as the relative portion of non-zero data units in respect of the entire content within the data portion. According to this example, if the relative portion of non-zero data units is equal or less than a predefined threshold (e.g. a predefined percentage of the data) the criteria is met. In another example, the predetermined criteria is met where a specifically defined range of data units within a data portion are determined as non-zero data-units (e.g. a certain range of LBA within the data portion, say from block 23 to block 55). In another example, the predefined criteria can be determined to be met only if one or more specific data units are determined as non-zero (e.g. $15^{th}$ block, $30^{th}$ block, $32^{nd}$ block, $57^{th}$ block and so on) in respect of each data portion. In yet another example, the predefined criteria can be determined to be met only if a predefined pattern of blocks is determined as non-zero (e.g. every $10^{th}$ block i.e. $10^{th}$ block, $20^{th}$ block, $30^{th}$ block, $40^{th}$ block etc) within each data portion. Thus, as apparent from the examples mentioned above, different kinds of criterion or combination of criteria can be used and the invention should not be limited to any kind of criterion or combination thereof.

In some implementations, the predetermined criteria can be set as a fixed criteria or condition, while in other implementations the predetermined criteria may by dynamically determined according to predefined rules. For example, a criterion determined as a threshold value of the relative portion of non-zero data content in respect of the entire content within the data portion can be set as a fixed value (e.g. 2% or 5% of the entire data content) or it can be dynamically adjusted according to the system's performance.

As the use of storage optimization consumes processing resources from the storage system and therefore may impact the overall performance of the system, there is a tradeoff between storage optimization and overall system performance. Accordingly, the decision whether to activate storage optimization, as well as the determination of a value of a corresponding criterion, can be dynamically set according to the current performance of the system.

In some implementations, the current free storage space is considered. For instance, the initial threshold value of the relative portion of non-zero data content in respect of the entire content within a data portion, can be set to 2% of the entire content and can then be continuously adjusted according to the system performance. Thus, for example in case control layer 103 detects that 90% of its physical storage is occupied with data, the threshold is automatically changed to say 5% in order to make more storage space available. In another example in case the system detects that less than 50% of the storage space is used, storage optimization is completely deactivated.

In other implementations the performance of the processing resources of the system is considered. For example in case the control layer 103 determines that the system is working under heavy processing load, the threshold value can be reduced to say 1%, (or in some cases storage optimization is completely shut down) in order to minimize the processing resources which are consumed by storage optimization.

In further implementations of the present invention the decision as to whether, and to what extent, storage optimization should be activated, is made, while considering both the current available storage space and the current load on the processing resources of the storage system. The decision is translated to values of a corresponding criterion and the criterion is set accordingly. For example, in case it is determined that the currently available physical storage space is less than 10% of the entire storage space, and accordingly the threshold value of the relative portion of non-zero data content in respect of the entire content should be raised, in order to free more storage space, the threshold value is raised only after the performance of the processing resources is considered as well. Thus, for example, if the processing resources are working in a more than 90% capacity, the value is raised only by 2, where in cases where the processing resources are working between 80 to 90 percent of their capacity, the value is raised by 4 and so forth.

According to the specific implementation which is being utilized control layer 103 (e.g. by SO module 107) can be operable to determine the storage space availability and/or the load on the system's processing resource, and based on one of these factors or a combination of the two, determine whether to operate storage optimization of the present invention. Control layer 103 (e.g. by SO module 107) can be further operable to set a value of a corresponding criterion according to one of the above factors or a combination thereof as demonstrated above.

The decision whether to activate storage optimization can be based on additional criteria other than the system performance and storage space occupancy. U.S. provisional No. 61/391,657, which is incorporated herein by reference, describes a system and method which is operable inter alia, for analyzing frequency of accessing (otherwise referred to as "frequency of addressing") certain data portions and characterizing each data portion in accordance with frequency of accessing thereof. The analyzed data portion can, for example, be stored at a specific location within the physical storage, according to the determined frequency. As explained in 61/391,657 this is done, inter alia, for improving the performance of a storage system. Such analysis can be used in the context of the present invention for determining whether to activate storage optimization. For example, control layer 103 can be operable to determine the accessing frequency of different data portions and submit to storage optimization of the present invention data portions which are characterized by an accessing frequency which is below a predefined value.

FIG. 2 is a flowchart illustrating operations which are performed in a storage optimization process, according to an embodiment of the invention. The operation described with reference to FIG. 2 can be performed, for example, by control layer 103 or more specifically by SO module 107 associated with control layer 103.

As explained above, the content of one or more data portions are received by control layer 103 as part of a background operation such as scrubbing or in a write request issued by a host. In some implementations, initially a decision is made as to whether, and to what extent, storage optimization should be activated. As described above with reference to FIG. 1, this decision can be made for example based on one or more of the following factors: the current occupancy of the storage space in the physical storage, the current load on the processing resources of the system, the source host or port of the data portion, and the accessing frequency of the data portion.

In case it is determined not to process with storage optimization, the process can turn to the processing of a different data portion, or the process can be terminated. In case it is determined to proceed with storage optimization, the data portion is analyzed and zero and non-zero content within the data portion is identified (stage 210) and then it is concluded whether non-zero (and zero) content of the source data unit meet one or more predetermined criteria (stage 220). The phrase "source data portion", as used herein, refers to the data portion which is being analyzed in an SO process.

As explained above. different types of criteria (or a combination thereof) can be used for this purpose. For example, the relative portion of non-zero data units within the source data portion can be determined and compared to a predefined threshold value. The threshold can be determined as the relative portion of blocks containing non-zero content out of the entire blocks populating the data portion. It should be noted that although the example uses relative portion of non-zero data units, a relative portion of zero can be used as well.

The exact value of corresponding criteria can be determined based on one or more of the factors mentioned above, which can include for example, the current occupancy of the storage space in the physical storage, the current load on the processing resources of the system, the source host or port of the data portion, and the accessing frequency of the data portion.

In case the predefined one or more criteria are met (e.g. the relative portion of non-zero data units is less than the predefined threshold) the process continues to stage 240. Otherwise the process is terminated (stage 230).

Optionally, before stage 240 it is determined whether the source data portion comprises of only zeros (stage 222) and in case it is a ZPR process is performed (stage 224) as explained above.

Continuing to stage 240, the logical address of the non-zero content (i.e. one or more data units) in respect of the source data portion, is identified. The location can be determined for example as the offset of each of one or more non-zero data blocks from the beginning of the source data portion (e.g. defined by its LBA).

Next each of the one or more non-zero data units are re-allocated to an area in the physical storage designated for storing non-zero data units originating from different source data portions (stage 250). In some implementations the designated area comprises one or more parts each of the same size as a data portion which is allocated to the physical storage space (referred herein as a "designated data portion").

In order to link between a given non-zero data unit (e.g. non-zero block of data) allocated to a designated area in the physical storage and its source data portion, the physical address of the non-zero data unit within the designated area is stored (in a corresponding allocation table) in association with the logical address of the non-zero data unit and the logical address of the source data portion (e.g. defined by its LBA) (stage 260).

In case the physical area comprises a designated data portion, the physical address of the designated area and the physical address of the non-zero data unit (e.g. the offset of the non-zero data unit in respect of the designated data portion) is stored in association with the logical address of the non-zero data unit and the logical address of the source data portion. Next, the physical storage space initially allocated to the source data portion is freed and returned to the pool of available physical storage space (stage 270).

In some implementations, different non-zero data units originating from different source data portions are directed and stored in specific designated areas (or designated data portions) based on various characteristics of the source data portions. For example, in case data portions are sorted in accordance with frequency of accessing thereof (as mentioned above with reference to U.S. provisional No. 61/391, 657) data units originating from data portions which are accessed very often (e.g. based on a predefined threshold) can be stored in one or more specific designated data portions allocated to the physical storage, while data units originating from other data portions which are accessed less often are stored in other designated data portions.

In another example, different designated areas (e.g. designated one or more data portions) can be determined for each host, such that data units originating from data portions received by one host are stored in a specific (one or more) designated data portions allocated to the physical storage, while data units originating from data portions received by another host are stored in a different (one or more) designated data portion.

Figure 3A:
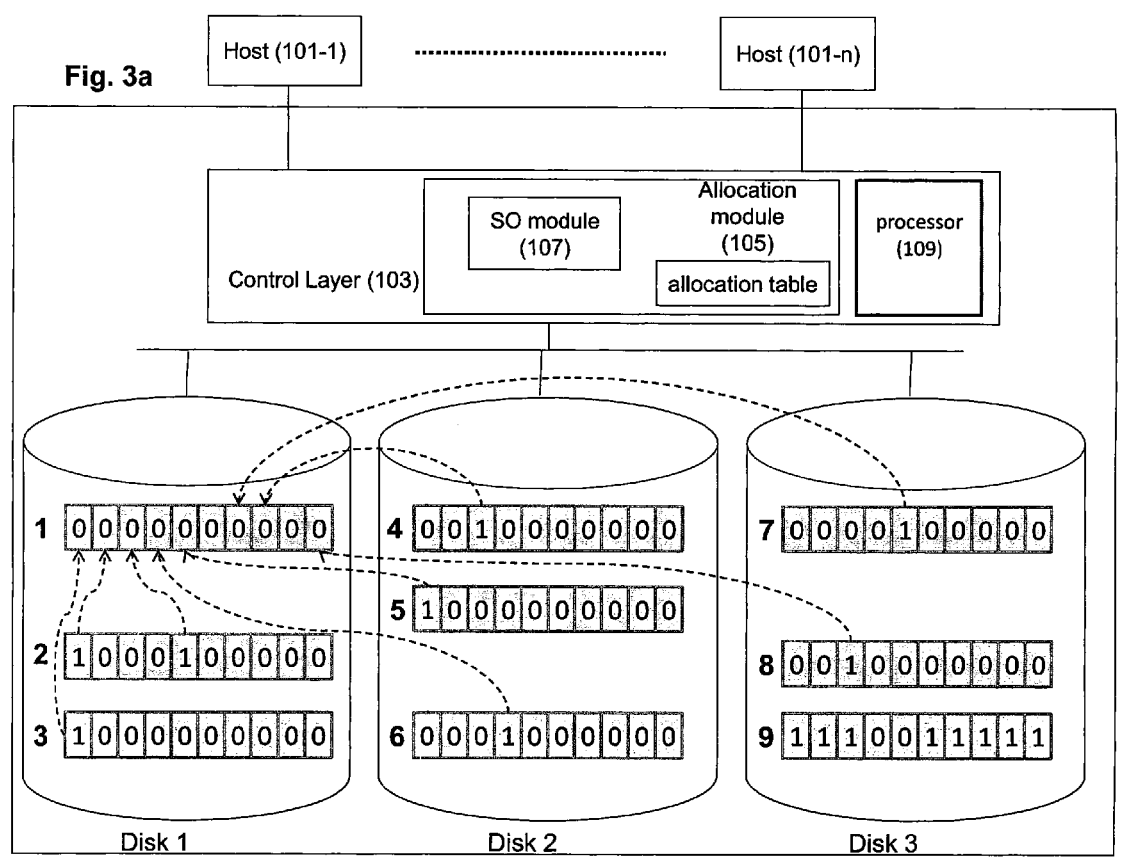

FIGS. 3a and 3b are illustrations demonstrating data allocation in a storage optimization process, according to an embodiment of the invention. It should be noted that FIGS. 3a and 3b are merely schematic illustrations which are used for providing a better explanation of the invention and should not be construed as limiting in any way. The data portions in FIGS. 3a and 3b and the cells being accommodated by the data portions, are merely schematic representation of actual data portions. FIG. 3a shows three disks (Disk 1, Disk 2 and Disk 3) being an example of storage devices $101_{1-n}$ illustrated in FIG. 1. Data portions are schematically represented as a vector of cells wherein each cell is denoted with a one digit or a zero digit. For better clarity, data portions are numbered from 1 to 9. Cells denoted with a one digit represent a data unit with non-zero data and cells indicated with a zero digit a data unit with all zero data. As would be apparent to any person skilled in the art, a 1 digit schematically represents the presence of non-zero data in the corresponding cell and does not indicate anything about the nature of the actual stored information. Cells correspond to any storage data unit of any size, constituting a data portion, and by way of non-limiting example may represent data blocks. In the illustrated example, Disks 1-3 contain 8 source data portions (data portions numbered 2 to 9). Two source data portions are allocated to Disks 1, and three source data portions are allocated to each of Disks 2 and 3. As explained above, in some implementations of the present invention, in storage optimization process, control layer 103 is configured to examine part or all the source data portions allocated to the storage devices associated to the storage system and determine whether a predefined one or more criteria is met. In the example in FIGS. 3a and 3b the predefined criterion is a preset value of the relative portion of non-zero data units in respect of the entire content within the data portion. Assuming, for the sake of example, that the threshold is defined as 20% non-zero data units or less (the same as 80% zero data units or more), in the schematic example illustrated in FIG. 3a source data portions 2-8 are characterized by a relative non-zero data unit which meets the predefined threshold (each data portion comprising 10 cells and no more than 2 cells with non-zero content). Data portion 9, on the other hand, is characterized by a greater relative portion of non-zero data units (i.e. cells indicated with a '1') and accordingly is not submitted to further processing.

Data portion 1 is a designated data portion. The non-zero data unit which is stored in each one of the source data portions (data portions 2-8) is allocated to a designated data portion (data portion 1) as indicated by the arrows. Control layer 103 is operable for storing in a corresponding allocation table, in respect of each of the source data portions 2-8, the physical address of the non-zero data units within the designated data portion in association with the logical address of non-zero data unit and logical address of its source data portion.

FIG. 3b is a schematic illustration demonstrating the physical memory in Disks 1-3 after storage optimization has been executed on data portions 2-8. As can be seen in the illustration, the source data portions 2-8 are no longer allocated to the physical memory and a single designated data portion (data portion 1) is now allocated to the physical storage and utilized for storing the non-zero data which was originally stored in source data portions 2-8. The operations demonstrated by FIGS. 3a and 3b are accompanied by suitable changes in corresponding allocation tables.

Figure 4:
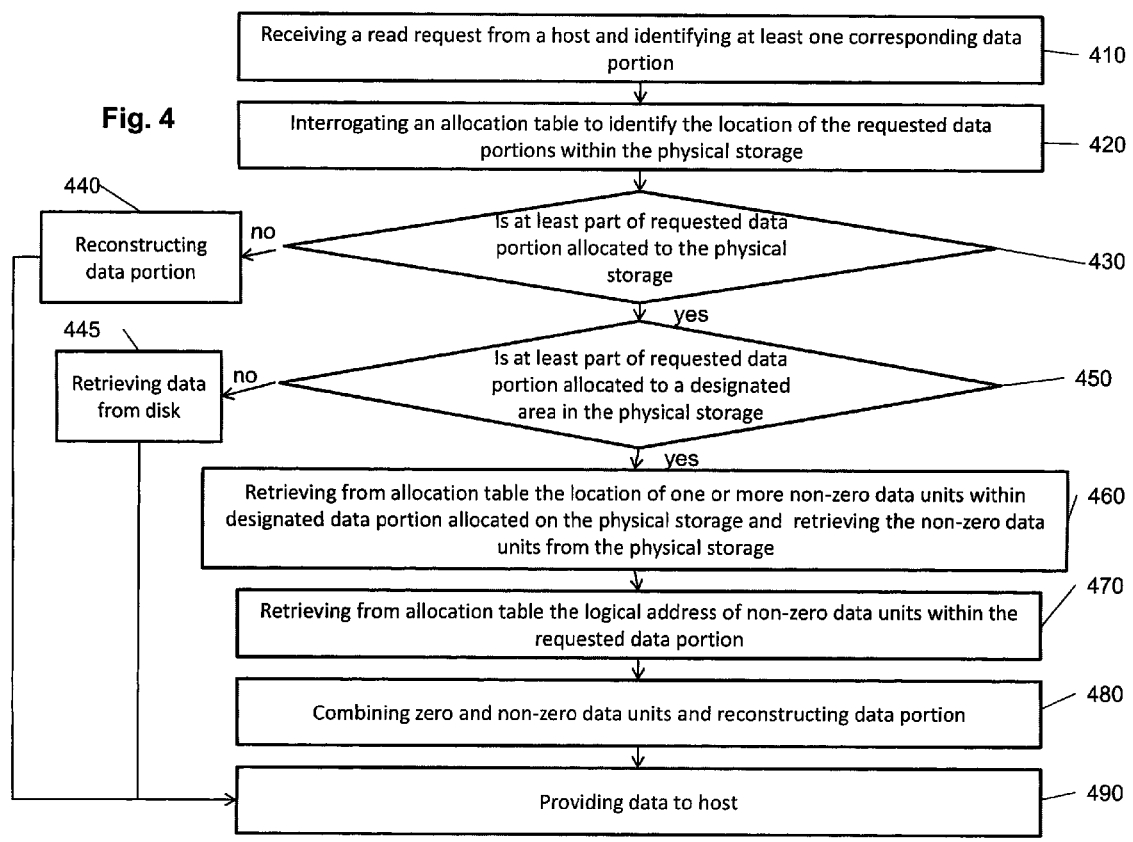
FIG. 4 is a flowchart illustrating operations which are performed in response to a read request, according to an embodiment of the invention.

FIG. 4 is a flowchart illustrating operations which are performed in response to a read request, according to an embodiment of the invention. When receiving a read request from a host, including the logical address (stage 410) of the data, storage control layer 103 is operable to (e.g. via allocation module 105) identify one or more corresponding data portions and to determine the physical location(s) of the desired data portions based on their logical addresses. To this end, an allocation table mapping between the logical address and physical address of the data is interrogated and the physical address is determined (stage 420).

If ZPR is performed as part or in addition to the storage optimization process of the present invention, the read request is analyzed for ZPR as well. Accordingly, in case a requested data portion is not associated with a physical location or in case it is explicitly indicated that the requested data portion has been un-mapped from the physical storage due to the fact that it contains only zeros (stage 430), the corresponding data portion is reconstructed (stage 440). The reconstructed data portion containing only zeros is provided to host (stage 490).

In case (in stage 430) it is determined that at least part of the requested data portions is allocated to the physical storage, it is next determined whether the requested data is allocated to a designated data portion (stage 450). As explained above, an allocation table which is managed by allocation module 105 can include an indication that enables to associate between the logical address of a requested data portion and a corresponding designated data portion allocated to the physical storage. In some implementations, the allocation table specifies information indicating the logical address of the non-zero data units (enabling to locate the non-zero data units within its original source data portions), the location of the corresponding designated data portion within the physical storage, and the location of the non-zero data units within the designated data portions. Thus, data portions whose non-zero content is allocated to a designated data portion, (which is in turn allocated to the physical memory) can be identified based on the presence of this information in association with their logical address in the allocation table.

In case it is determined that the requested data portion is not allocated to a designated data portion in the physical storage, the requested data portion is retrieved from the physical storage (stage 445) and provided to the requesting host (stage 490) in a known read operation.

In case it is determined that the requested data portion has been stored by a storage optimization process of the present invention, the physical address of the corresponding designated data portion and the location of the non-zero data units within the designated data portion are retrieved from the allocation table. This information is used for retrieving the non-zero data units of the requested data portion from the corresponding designated data portion allocated to the physical storage (stage 460).

Next the logical address of the retrieved non-zero data units in respect of its source (i.e. requested) data portion is retrieved from the allocation table (stage 470). Based on the logical address, the non-zero data units can be combined with regenerated zero data units and the original source data portion can be thereby reconstructed (stage 480). The reconstructed data portion is provided to the requesting host (stage 490).

It should be noted that in some cases, a single source data portion may contain one non-zero data unit (e.g. data block) or a plurality thereof as depicted for example in FIG. 3a. In case a single source data portion contains more than one non-zero data unit (e.g. data portion 2 in FIG. 3a) the allocation table specifies the logical address of each data unit and its location within the designated data portion allocated to the physical storage.

It will be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the claims associated with the present invention.

The invention claimed is:

1. A storage system, the system comprising:
a plurality of physical storage devices constituting a physical storage space controlled by a plurality of storage control devices constituting a storage control layer, said storage control layer operatively coupled to the plurality of physical storage devices, wherein the storage control layer being operable to analyze a data portion and to identify zero and non-zero data units within the data portion, and in case of identifying that the data portion comprises a combination of at least one zero data unit and at least one non-zero data unit, wherein the combination meets one or more predetermined criteria, said control layer is further operable to perform at least the following:
re-allocate only the at least one non-zero data unit to a physical address within a designated area in the physical storage space that is designated for storing non-zero data units originating from different data portions, and associate the physical address with a logical address of the at least one non-zero data unit and with a logical address of the data portion; and in case said data portion is allocated in said physical storage space, free space initially allocated to said data portion.

2. The system of claim 1 wherein in response to a read request with respect to the data portion, said control layer is operative to perform at least the following:
identify that the data portion comprising said at least one non-zero data unit characterized by the logical address associated with the physical address within said designated area;
retrieve said at least one non-zero data unit from said designated area based on the physical address;
locate said at least one non-zero data unit within said data portion based on logical addresses of said data portion and the logical address characterizing said non-zero data unit.

3. The system of claim 2 wherein said control layer is further operable to regenerate said at least one zero data unit in order to reconstruct said data portion.

4. The system of claim 1 wherein at least one of said one or more criteria is selected from a group consisting of:
I) a preset value of a relative portion of non-zero data units in respect of entire data within said data portion;
II) a predefined range of data units within said data portion;
III) a predefined pattern of data units within said data portion; and
IV) a predefined combination of specific data units within said data portion.

5. The system of claim 1 wherein said control layer is further operable to determine whether to re-allocate said at least one non-zero data unit based on current storage space availability within said physical storage devices and/or current load on processing resources of said storage system.

6. The system of claim 1 wherein said control layer is further operable to determine frequency of access to said data portion and to re-allocate data units originating from said data portion to a specific designated area of designated areas within said physical storage according to said frequency of access.

7. The system of claim 1 wherein in case said control layer determines that said data portion comprises only zero data units, said control layer is operable to perform at least the following:
un-map said data portion from said physical storage space while maintaining the logical address of said data portion, in case said data portion is allocated in said physical storage space; and,
provide the logical address to said data portion in case said data portion is not allocated in said physical storage space.

8. The system of claim 1 wherein said control layer is operatively connected to one or more hosts and wherein said data portion is received from a host of said one or more hosts in a write request to said physical storage space.

9. The system of claim 1 wherein said control layer is operable for performing scrubbing, and wherein said data portion is retrieved from said physical storage space as part of said scrubbing.

10. An SO (storage optimization) module operatively connectable to a storage control layer in a storage system, the storage system comprising a plurality of physical storage devices constituting a physical storage space controlled by a plurality of storage control devices constituting said storage control layer, said layer operatively coupled to the plurality of physical storage devices;
said SO module being operable to analyze a data portion and to identify zero and non-zero data units within the data portion, and in case of identifying that the data portion comprises a combination of at least one zero data unit and at least one non-zero data unit, wherein the combination meets one or more predetermined criteria, said control layer is further operable to perform at least the following:
re-allocate only the at least one non-zero data unit to a physical address within a designated area in the physical storage space that is designated for storing non-zero data units originating from different data portions; and associating the physical address with a logical address of the at least one non-zero data unit and with a logical address of the data portion; and in case said data portion is allocated in said physical storage space, free space initially allocated to said data portion.

11. A method of allocating data to a physical data storage associated with a storage system, the method comprising instructing a processor associated with said storage system to perform at least the following:
analyzing a data portion to identify zero and non-zero data units within the data portion;
in case said data portion is determined to comprise a combination of at least one zero data unit and at least one non-zero data unit, wherein the combination meets one or more predetermined criteria, performing the following:
re-allocating only the at least one non-zero data unit to a physical address within a designated area in the physical data storage that is designated for storing non-zero data units originating from different data portions;
associating the physical address with a logical address of said at least one non-zero data unit and with a logical address of said data portion; and
in case said data portion is allocated in said physical data storage, un-map said data portion from said physical data storage and free space initially allocated to the data portion.

12. The method of claim 11 wherein at least one of said one or more criteria is selected from a group consisting of:
I) a preset value of a relative portion of non-zero data units in respect of entire data within said a data portion;

II) a predefined range of data units within said data portion;

III) a predefined pattern of data unit within said data portion; and

IV) a predefined combination of specific data units within said data portion.

13. The method of claim 11 further comprising:

determining whether to re-allocate the non-zero data unit based on current storage space availability within said physical storage devices and/or current load on processing resources.

14. The method of claim 11 further comprising:

determining frequency of access to said data portion; and allocating data units originating from said data portion to specific designated areas within said physical storage which are selected based on said frequency of access.

15. The method of claim 11 further comprising:

in case it is determined that said data portion comprises only zero data: un-mapping said data portion from said physical data storage while maintaining the logical address of said data portion in case said data portion is allocated to said physical data storage; and, providing a logical address to said data portion in case said data portion is not allocated in said physical data storage.

16. The method of claim 11 wherein said data portion is received from a host operatively connected to said storage system.

17. The method of claim 11 further comprising:

performing scrubbing, and wherein said data portion is retrieved from said physical data storage as part of said scrubbing.

18. A program storage device readable by machine, tangibly embodying a program of instructions executable by the machine to perform method steps of allocating data to a physical data storage associated with a storage system, the method comprising:

analyzing a data portion to identify zero and non-zero data units within the data portion;

in case said data portion is determined to comprise a combination of at least one zero data unit and at least one non-zero data unit, wherein the combination meets one or more predetermined criteria, instructing a processor associated with said storage system to perform at least the following:

re-allocating only the at least one non-zero data unit to a physical address within a designated area in the physical data storage that is designated for storing non-zero data units originating from different data portions;

associating the physical address with a logical address of said at least one non-zero data unit and with a logical address of said data portion; and in case said data portion is allocated in said physical data storage, un-map said data portion from said physical storage, and free space initially allocated to the data portion.

* * * * *